(12) United States Patent
Karasawa et al.

(10) Patent No.: US 9,199,346 B2
(45) Date of Patent: Dec. 1, 2015

(54) MANUFACTURING APPARATUS FOR FLATTENED TUBE FINS

(71) Applicant: HIDAKA SEIKI KABUSHIKI KAISHA, Tokyo (JP)

(72) Inventors: Masanao Karasawa, Tokyo (JP); Toshiyuki Nanaarashi, Tokyo (JP); Akio Ueda, Tokyo (JP); Yasuyuki Morimoto, Kuwana (JP); Takatoshi Mori, Kuwana (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 388 days.

(21) Appl. No.: 13/683,357

(22) Filed: Nov. 21, 2012

(65) Prior Publication Data

US 2013/0160516 A1    Jun. 27, 2013

(30) Foreign Application Priority Data

Dec. 22, 2011  (JP) ................................. 2011-281973
Apr. 18, 2012   (JP) ................................. 2012-094416

(51) Int. Cl.
*B21D 53/02*   (2006.01)
*B21D 43/02*   (2006.01)
*B23P 15/26*   (2006.01)
*B21D 35/00*   (2006.01)
*B21D 43/22*   (2006.01)

(52) U.S. Cl.
CPC ............... *B23P 15/26* (2013.01); *B21D 43/021* (2013.01); *B21D 43/22* (2013.01); *B21D 53/022* (2013.01); *B21D 35/003* (2013.01); *B21D 43/023* (2013.01)

(58) Field of Classification Search
CPC .................. Y10T 29/53113; Y10T 29/53122; B21C 37/22; B21D 53/02; B21D 53/022; B21D 53/04; B21D 53/06
See application file for complete search history.

(56) References Cited

U.S. PATENT DOCUMENTS 5,768,772 A  *  6/1998  Buechele ......................... 29/830
2006/0182562 A1*  8/2006  Milliman ................. 414/416.08
2012/0222293 A1*  9/2012  Ueda et al. ....................... 29/727

FOREIGN PATENT DOCUMENTS

JP            05-192728 A       3/1993

* cited by examiner

*Primary Examiner* — Peter DungBa Vo
*Assistant Examiner* — John S Lowe
(74) *Attorney, Agent, or Firm* — Birch, Stewart, Kolasch & Birch, LLP

(57) ABSTRACT

A manufacturing apparatus that manufactures flattened tube fins, in which cutaway portions for inserting flattened tubes for heat exchanging are formed, includes: a press apparatus provided with a mold apparatus that forms the cutaway portions in an unmachined metal thin plate to produce a metal strip; an inter-row slit apparatus cutting the metal strip into predetermined widths to form a plurality of metal strips of a product width; a cutoff apparatus cutting each metal strip of the product width into predetermined lengths; a holding apparatus that holds a plurality of metal strips of the product width that protrude from a downstream side in the conveying direction of the cutoff apparatus; and a stacker apparatus for stacking the flattened tube fins that have been cut into predetermined lengths by the cutoff apparatus.

11 Claims, 13 Drawing Sheets

INITIAL POSITION

INITIAL POSITION

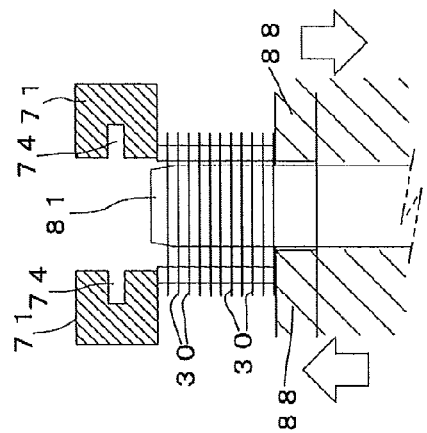
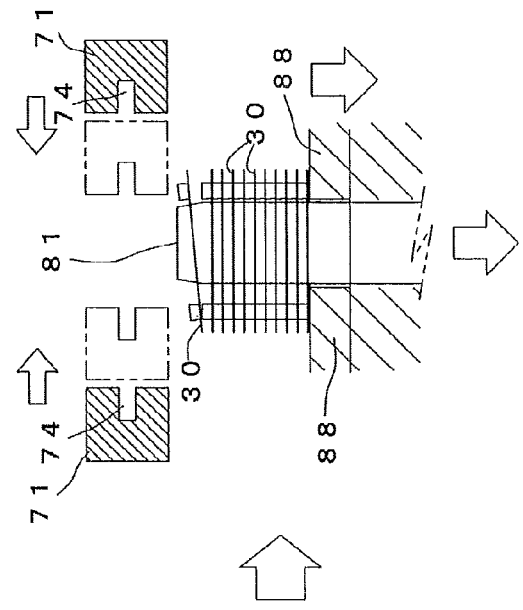
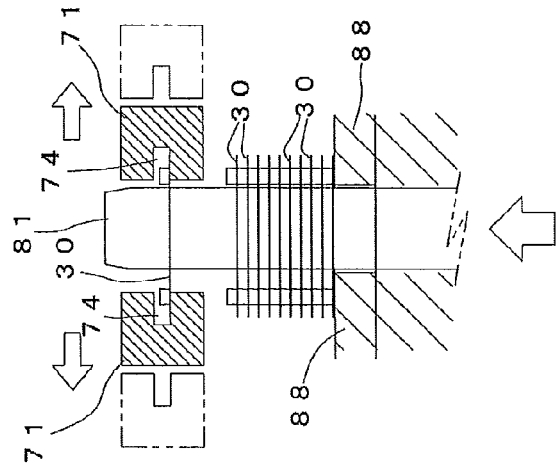

MANUFACTURING APPARATUS FOR FLATTENED TUBE FINS

CROSS-REFERENCE TO RELATED APPLICATION(S)

This application is based upon and claims the benefit of priority of the prior Japanese Patent Application No. 2011-281973, filed on Dec. 22, 2011 and the prior Japanese Patent Application No. 2012-94416, filed on Apr. 18, 2012, and the entire contents of which are incorporated herein by reference.

FIELD

The present invention relates to a manufacturing apparatus for manufacturing fins for use in a heat exchanger that uses flattened tubes.

BACKGROUND

An existing heat exchanger, such as an air conditioner, is typically constructed by stacking a plurality of heat exchanger fins, in which a plurality of through-holes have been formed to enable heat exchanger tubes to be inserted.

Such heat exchanger fins are manufactured by a manufacturing apparatus for heat exchanger fins depicted in FIG. 14.

The manufacturing apparatus for heat exchanger fins is equipped with an uncoiler 12 where a thin metal plate 10 made of aluminum or the like has been wound into a coil. The metal strip 10 pulled out from the uncoiler 12 via pinch rollers 14 is inserted into an oil applying apparatus 16 where machining oil is applied onto the surface of the metal strip 10, and is then supplied to a mold apparatus 20 provided inside a press apparatus 18.

The mold apparatus 20 internally includes an upper mold die set 22 that is capable of up-down movement and a lower mold die set 24 that is static. A plurality of collar-equipped through-holes (not illustrated), where collars of a predetermined height are formed around through-holes, are formed at predetermined intervals in a predetermined direction by the mold apparatus 20.

The result of machining the metal thin plate to produce the through-holes and the like is hereinafter referred to as the "metal strip 11". After being conveyed a predetermined distance in the predetermined direction, the metal strip 11 is cut into predetermined lengths by a cutter 26. The products (heat exchanger fins) produced by such cutting into predetermined lengths are stored in a stacker 28. The stacker 28 has a plurality of pins 27 erected in the perpendicular direction and stacks the manufactured heat exchanger fins with the pins 27 inserted into the through holes.
Patent Document 1
  Japanese Laid-Open Patent Publication No. H05-192728

SUMMARY

On an existing heat exchanger fin, a plurality of through-holes into which heat exchanger tubes are inserted are formed in a metal strip.

However, at present, heat exchangers that use multi-channel flattened tubes are being developed. A heat exchanger fin that uses such flattened tubes is depicted in FIGS. 15A and 15B (and will be referred to hereinafter as a "flattened tube fin").

On a flattened tube fin 30, cutaway portions 34 into which the flattened tubes 32 are inserted are formed at a plurality of positions, and plate-like portions 36, where louvers 35 are formed, are formed between cutaway portion 34 and cutaway portion 34.

The cutaway portions 34 are formed from only one side in the width direction of a flattened tube fin 30. Accordingly, the plate-like portions 36 between cutaway portion 34 and cutaway portion 34 are joined by a joining portion 38 that extends along the length direction.

However, when such a flattened tube fin is manufactured by an existing heat exchanger fin manufacturing apparatus, the following problem occurs.

An existing heat exchanger fin has a plurality of through-holes formed therein and the manufactured heat exchanger fins are stacked in a stacker 28 where pins 27 are disposed so as to pass through the through-holes. However, since through-holes are not formed in the flattened tube fin described above, when stacking the fins, it is not possible to insert pins so as to align the fins. Also, since a flattened tube fin does not have a shape that is symmetrical in the width direction, the weight balance of a flattened tube is off-center in the width direction, so it would be conceivable for problems to occur even during simple stacking of the flattened tube fins.

In addition, although flattened tube fins are obtained by cutting off a metal strip of the product width into predetermined lengths, until such cutting off into lengths, the metal strip of the product width is held and positioned by air chucking. A large frictional force is therefore produced between the metal strip of the product width and the air chucking unit, which could conceivably result in the problem of the metal strip of the product width buckling at the air chucking unit when the metal strip of the product width is fed out of the cutting apparatus.

For this reason, when manufacturing heat exchanger fins as represented by flattened tube fins, in addition to the problem of how to stack the fins, there is also the problem of how to feed the metal strip of the product width out of the cutting off apparatus.

The present invention was conceived to solve the problem described above and has an object of providing a manufacturing apparatus for flattened tube fins capable of reliably manufacturing flattened tube fins in which through-holes are not formed.

A manufacturing apparatus according to the present invention manufactures flattened tube fins in which cutaway portions, into which flattened tubes for heat exchanging are inserted, are formed from one side toward another side in a width direction, the manufacturing apparatus including: a press apparatus equipped with a mold apparatus that forms the cutaway portions in an unmachined thin plate of metal to produce a metal strip; an inter-row slit apparatus which cuts the metal strip, in which the cutaway portions have been formed, into predetermined widths to form a plurality of metal strips of a product width that are arranged in the width direction; a cutoff apparatus that cuts each of the plurality of metal strips of the product width into predetermined lengths; a holding apparatus that holds the plurality of metal strips of the product width that have been formed by the inter-row slit apparatus, have been fed in the conveying direction, have passed the cutoff apparatus, and protrude out from a downstream side in the conveying direction of the cutoff apparatus, guides a conveying direction of the metal strips of the product width, and maintains a held state even after cutting into the predetermined lengths by the cutoff apparatus to form the flattened tube fins; and a stacker apparatus for stacking the flattened tube fins cut into the predetermined lengths by the cutoff apparatus, wherein the holding apparatus includes pairs of supports that are provided so as to be capable of moving toward and away from one another between a position to the side of the metal strips of the product width fed from the inter-row slit apparatus and a holding position for the metal strips of the product width, and the stacker apparatus includes: a plurality of stacking pins that are inserted through the cutaway portion of the flattened tube fins and are aligned in a length direction of the flattened tube fins in order to stack the flattened tube fins held by the holding apparatus; and a raising/lowering means for raising and lowering the stacking pins in a direction of the holding apparatus.

By using this configuration, the metal strips of the product width that have been fed out to the downstream side in the conveying direction from the cutoff apparatus are held by the holding apparatus and move by sliding without being held by air chucking. This means that there is less friction between the holding apparatus and the metal strips of the product width and there is no buckling of the metal strips of the product width when conveying the metal strips of the product width. It is also possible to use stacking pins that pass through the cutaway portions to stack the flattened tube fins obtained by cutting off the metal strips of the product width. Since the stacking pins are inserted through the cutaway portions of the metal strips of the product width by moving toward and away from the holding apparatus, the height by which the flattened tube fins are dropped from the holding apparatus can be reduced. By doing so, even flattened tube fins in which through holes for inserting pins are not provided and whose weight balance in the left-right direction is unbalanced can be stacked in a state that is stabilized by the stacking pins, which makes it possible to easily and reliably manufacture flattened tube fins.

The raising/lowering means of the stacker apparatus may operate so that a distance by which the stacking pins are raised relative to the holding apparatus gradually decreases as the number of flattened tube fins stacked with the stacking pins inserted therethrough increases.

By using this configuration, it is possible to prevent the flattened tube fins that are already stacked on the stacking pins from colliding with the lower surfaces of the supports and to avoid a drop in yield due to damage to the flattened tube fins.

In addition, the raising/lowering means of the stacker apparatus may operates so that the stacking pins are inserted in order from a cutaway portion on a cutoff apparatus side of metal strips of the product width to a cutaway portion on a downstream side in a conveying direction of the metal strips of the product width.

By using this configuration, the first stacking pins are inserted first through cutaway portions on the cutoff apparatus side of the metal strips of the product width fed out from the cutoff apparatus. The cutaway portions on the cutoff apparatus side have no or extremely little displacement. This means that by inserting the stacking pins, it is possible to correct the positions of the front end parts in the conveying direction of the metal strips of the product width and to reliably insert the stacking pins through all of the cutaway portions.

In addition, the stacking pins may be formed so that positions in a height direction of top ends thereof become gradually lower as the distance from the cutoff apparatus side increases. By using this configuration, the first stacking pins are inserted first through cutaway portions on the cutoff apparatus side of the metal strips of the product width fed out from the cutoff apparatus. The cutaway portions on the cutoff apparatus side have no or extremely little displacement. This means that by inserting the stacking pins, it is possible to correct the position of the front end parts in the conveying direction of the metal strips of the product width and to reliably insert the stacking pins through all of the cutaway portions.

The stacker apparatus may be provided with regulating pins that are raised and lowered by the raising/lowering means together with the stacking pins and contact one side surface of the metal strips of the product width when raised to regulate positions of the metal strips of the product width.

By using this configuration, it is possible to orderly stack the flattened tube fins on the stacking pins, and a process for correcting the stacked state of the flattened tube fins when the flattened tube fins are passed over is unnecessary, which makes it possible to raise the manufacturing efficiency for flattened tube fins.

The supports may include regulating pin clearance portions for avoiding interference with the regulating pins.

By using this configuration, it is possible for the regulating pins to reliably contact the side surfaces of the metal strips of the product width without being obstructed by the supports.

In addition, the supports may be formed with U-shaped cross sections.

By using this configuration, since air chucking is not necessary when conveying the metal strips of the product width from the inter-row slit apparatus, there is a great reduction in friction between the supports and the metal strips of the product width so that there is no buckling of the metal strips of the product width when conveying the metal strips of the product width. This makes it possible to improve the product yield.

The stacker apparatus may include fin receiving portions that contact a lower surface of a lowest flattened tube fin out of a plurality of flattened tube fins through which the stacking pins have been inserted and are capable of being raised and lowered independently of a raising/lowering operation of the stacking pins.

By using this configuration, since the stacking pins and the fin receiving portions are capable of independent up-down movement, when the number of stacked fins is low, it is possible to set the position where the fin receiving portions receive a flattened tube fin higher in advance regardless of the distance moved up and down by the stacking pins. This means that the distance dropped by a flattened tube fin is shortened, the stacking of the flattened tube fins can be carried out reliably, and, by setting the fin receiving portions at a high position in advance, the distance moved up and down by the fin receiving portions can be reduced, which reduces the time spent by up-down movement of the fin receiving portions. By reducing the time spent by up-down movement of the fin receiving portions, it is possible to shorten the manufacturing cycle for one flattened tube fin, thereby increasing the manufacturing efficiency.

The fin receiving portions may operate so as to raise the plurality of flattened tube fins stacked with the stacking pins inserted therethrough and place an upper surface of a top flattened tube fin out of the stacked flattened tube fins in contact with a lower surface of the holding apparatus so as to align the stacked flattened tube fins.

By using this configuration, even in a unfavorable stacking state such as where a flattened tube fin stacked on the fin receiving portions is somewhat inclined, by pressing the upper surfaces and lower surfaces of the stacked flattened tube fins between the fin receiving portions and the holding apparatus, it is possible to produce a stacked state where the flattened tube fins are neatly aligned.

The manufacturing apparatus that manufactures flattened tube fins may further include a control unit that controls operations of the holding apparatus, the stacking pins and the fin receiving portions, wherein the control unit may carry out control so that: after a metal strip of the product width held by the holding apparatus has been cut by the cutoff apparatus to form a flattened tube fin, the stacking pins are raised so as to advance into the cutaway portions of the flattened tube fin held by the holding apparatus; the pair of supports of the holding apparatus are moved away from one another to drop the flattened tube fin along the stacking pins; after the flattened tube fin drops, the stacking pins are lowered until upper end portions of the stacking pins reach an initial position that is below the holding apparatus; the fin receiving portions are lowered until an upper surface of the flattened tube fin positioned at a top of the stacked flattened tube fins reaches a predetermined position that is below the holding apparatus; the pair of supports of the holding apparatus are moved toward one another to a holding position where it is possible to hold the metal strip of the product width before cutting by the cutoff apparatus; the fin receiving portions align the stacked flattened tube fins by placing the upper surface of the flattened tube fin positioned at the top out of the stacked flattened tube fins in contact with the lower surfaces of the pair of supports of the holding apparatus; and after aligning the flattened tube fins, the fin receiving portions are lowered to a receiving position where a dropped flattened tube fin will be received when the next flattened tube fin is dropped.

By using this configuration, it is possible to press the upper and lower surfaces of the stacked flattened tube fins between the fin receiving portions and the holding apparatus, which makes it possible to produce a stacked state where the flattened tube fins are neatly aligned. It is also possible to carry out this aligning operation efficiently.

The control unit may carry out control so that the receiving position of the fin receiving portions is lowered in keeping with an increase in the number of stacked flattened tube fins.

By using this configuration, it is possible to prevent the stacked flattened tube fins from contacting the holding apparatus and avoid a drop in yield due to damage to the flattened tube fins.

BRIEF DESCRIPTION OF THE DRAWINGS

FIG. 3 is viewed from above;

FIG. 3 is viewed from the front in the conveying direction;

FIGS. 10A, 10B and 10C are front views for a case when looking from the front in the conveying direction depicting the operation of the holding apparatus and the stacker apparatus when stacking a flattened tube fin in a stacker apparatus in which a plurality of flattened tube fins are already stacked;

DESCRIPTION OF EMBODIMENT(S)

Figure 1:
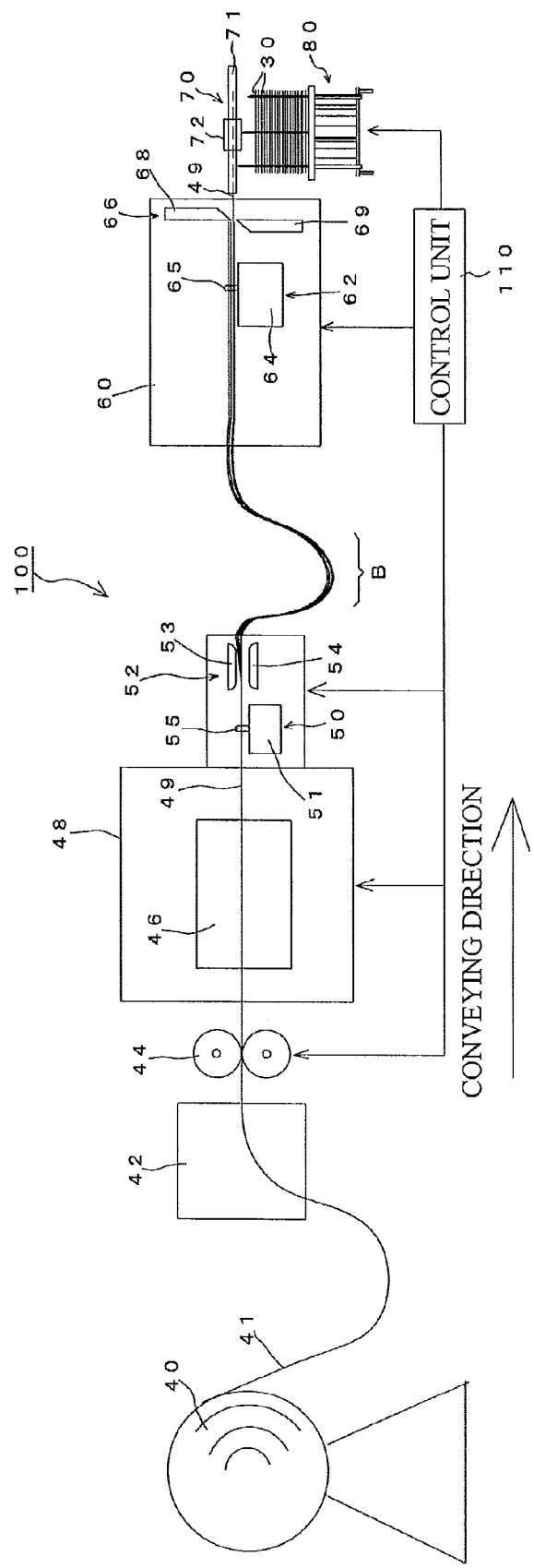
FIG. 1 is a simplified side view depicting the overall configuration of a manufacturing apparatus for flattened tube fins according to the present invention.

The overall configuration of a manufacturing apparatus 100 for flattened tube fins according to an embodiment of the present invention is depicted in FIG. 1. A thin metal plate 41 that is made of aluminum or the like and is yet to be machined is wound in a coil in an uncoiler 40. The thin plate 41 pulled out from the uncoiler 40 is inserted into a loop controller 42, and fluctuations in the thin plate 41 that is intermittently fed out are suppressed by the loop controller 42.

An NC feeder 44 is provided downstream of the loop controller 42. The NC feeder 44 is composed of two rollers that touch the upper surface and the lower surface of the thin plate 41. By rotationally driving the two rollers of the NC feeder 44, the thin plate 41 is sandwiched and intermittently fed.

A press apparatus 48 that has a mold apparatus 46 disposed inside is provided downstream of the NC feeder 44. Using the press apparatus 48, the thin plate 41 is formed into a metal strip 49 of a predetermined shape by the mold apparatus 46.

Figure 2:
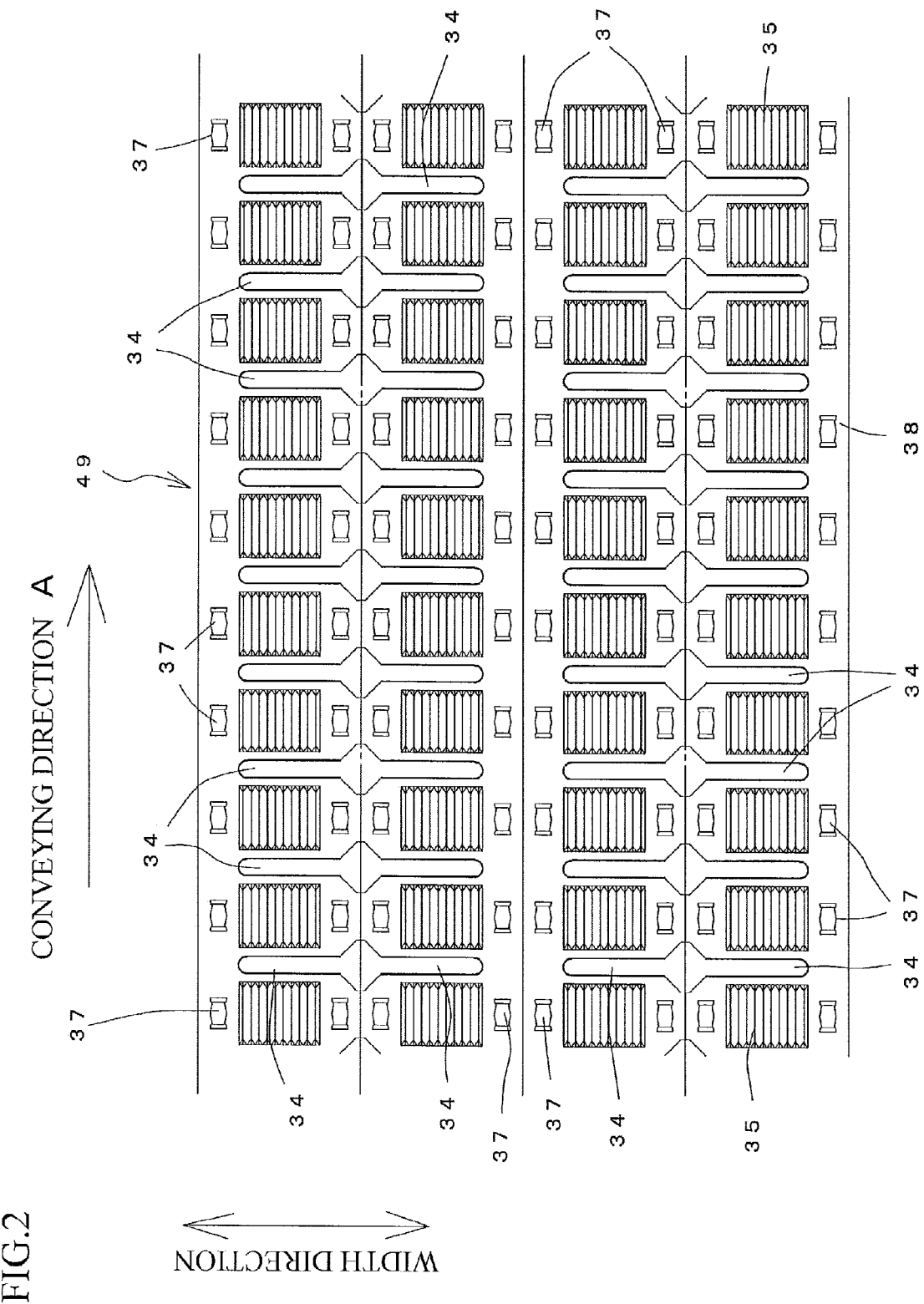
FIG. 2 is a plan view of a metal strip machined by the mold apparatus appearing in FIG. 1.

The metal strip 49 formed by the press apparatus 48 is depicted in FIG. 2. The metal strip 49 depicted in FIG. 2 has four products formed in a line in the width direction that is perpendicular to the arrow A that indicates the conveying direction.

Figures 15A, 15B:
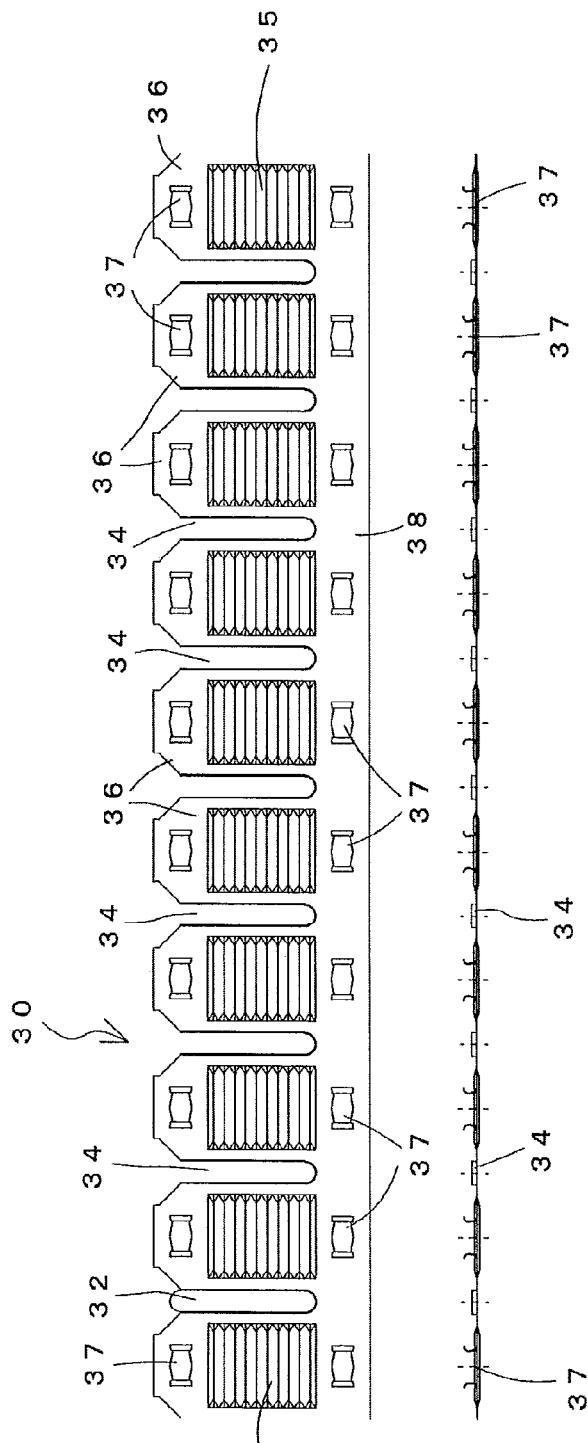
FIGS. 15A and 15B are plan views of a flattened tube fin.

As depicted in FIGS. 15A and 15B, the specific products obtained from the metal strip 49 each have the cutaway portions 34 into which the flattened tubes 32 will be inserted formed at a plurality of positions and the plate-like portions 36, where louvers 35 are formed, formed between cutaway portion 34 and cutaway portion 34. Openings 37 formed by cutting and folding up the thin metal plate are formed at both end portions in the width direction of the louvers 35. Out of the two openings 37, 37 formed for one louver 35, one opening 37 is formed at a front end side of a plate-like portion 36.

The cutaway portions 34 are formed from only one side in the width direction of each flattened tube fin 30. Accordingly, the plurality of plate-like portions 36 between cutaway portion 34 and cutaway portion 34 are continuously joined by a joining portion 38 that extends in the length direction.

Out of the two openings 37, 37 for one louver 35 described above, the opening 37 on the other side is formed on the joining portion 38.

On the metal strip 49 depicted in FIG. 2, two products disposed with the open ends of the cutaway portions 34 adjacent to one another form a pair, and two of such pairs are formed. That is, the pairs, in which the open ends of the cutaway portions 34 of two products are disposed facing one another, are placed so that the joining portions 38 thereof are adjacent.

In this way, by disposing four products in an alternating arrangement, the left-right load balance of the mold is improved.

Note that unlike a metal strip such as that depicted in FIG. 2, if the cutaway portions 34 of a plurality of products were disposed so that the open ends all face in a single direction, when cutting is carried out between the products by an inter-row slit apparatus 52 (described later) that cuts out the products, there would be a high probability that cutting fragments (or "whiskers" or "cutting defects") would be produced between the cutaway portions 34 and the other positions due to displacements in the cutting positions. Accordingly, when the open ends of the cutaway portions 34 of a plurality of products are all disposed so as to face in a single direction, it becomes necessary to cut not at the boundary of the openings of the cutaway portions 34 but to slightly extend the open parts of the cutaway portions 34 as far as a position advanced into a joining portion 38 and to cut at such position. However, in such case, the cross-section becomes stepped and there is deterioration in the left-right load balance of the mold. Accordingly, it is preferable to manufacture a plurality of products with the arrangement depicted in FIG. 2.

The description will now return to the overall construction of the manufacturing apparatus 100 for flattened tube fins.

The metal strip 49 formed by the mold apparatus 46 in the press apparatus 48 as depicted in FIG. 1 is conveyed intermittently by a feeding apparatus 50 provided downstream of the press apparatus 48. The feed timing of the feeding apparatus 50 is set so that the feeding apparatus 50 operates in concert with the NC feeder 44 to enable stable intermittent feeding.

In the feeding apparatus 50, a reciprocating unit 51 that is capable of moving in the horizontal direction moves reciprocally between an initial position and a conveyed position to pull the metal strip 49. Feed pins 55 that protrude upward are disposed on the upper surface of the reciprocating unit 51, the feed pins 55 advance from below into the cutaway portions 34 formed in the metal strip 49, and the metal strip 49 is moved to the conveyed position by pulling with the feed pins 55.

The inter-row slit apparatus 52 is provided downstream of the feeding apparatus 50. The inter-row slit apparatus 52 includes upper blades 53 disposed on the upper surface side of the metal strip 49 and lower blades 54 disposed on the lower surface side of the metal strip 49. The inter-row slit apparatus 52 may be provided so as to operate using an up-down movement operation of the press apparatus 48.

The upper blades 53 and the lower blades 54 are formed so as to be elongated in the conveying direction of the metal strip 49 and the intermittently fed metal strip 49 is cut by the upper blades 53 and the lower blades 54 coming together so as to manufacture products (referred to below as "metal strips of the product width") in the form of long strips in the conveying direction.

The plurality of metal strips 49 of the product width that have been cut to the product width by the inter-row slit apparatus 52 are fed into a cutoff apparatus 60.

Note that before feeding into the cutoff apparatus 60, the plurality of metal strips 49 of the product width are disposed with predetermined intervals between neighboring metal strips 49 of the product width. A buffer part B is also formed so that before feeding into the cutoff apparatus 60, sections of the plurality of metal strips 49 of the product width that are longer than the length of one feeding operation by the cutoff apparatus 60 are temporarily held and allowed to sag downward.

A feeding apparatus 62 that intermittently conveys the plurality of metal strips 49 of the product width in the conveying direction is provided inside the cutoff apparatus 60. As the construction of the feeding apparatus 62, a construction where it is possible to set the length of one feeding operation longer than the construction of the feeding apparatus 50 provided at the downstream side of the press apparatus 48 is used.

In the feeding apparatus 62, a conveying unit 64 that is capable of moving in the horizontal direction moves by a predetermined distance to pull the metal strips 49 of the product width from the press apparatus 48 side and push the metal strips 49 of the product width to the downstream side of the cutoff apparatus 60. On the upper surface of the conveying unit 64, a plurality of feeding pins 65 are disposed so as to protrude upward and are aligned in the horizontal direction in an equal number of rows to the number of metal strips 49 of the product width. The feeding pins 65 are inserted from below into the cutaway portions 34 formed in the respective metal strips 49 of the product width, and due to being pulled by the feeding pins 65, the metal strips 49 of the product width move as far as a conveyed position.

A cutting apparatus 66 is provided downstream of the feeding apparatus 62 inside the cutoff apparatus 60.

The cutting apparatus 66 cuts the respective metal strips 49 of the product width into predetermined lengths to form the flattened tube fins 30. The cutting apparatus 66 includes an upper blade 68 disposed on the upper surface side of the metal strips 49 of the product width and a lower blade 69 disposed on the lower surface of the metal strips 49 of the product width.

By closing the upper blade 68 and the lower blade 69, the metal strips 49 of the product width are cut into predetermined lengths along the conveying direction to manufacture the flattened tube fins 30.

A holding apparatus 70 and a stacker apparatus 80 that stacks the manufactured flattened tube fins 30 in the plate thickness direction (up-down direction) are provided downstream of the cutoff apparatus 60.

Figure 3:
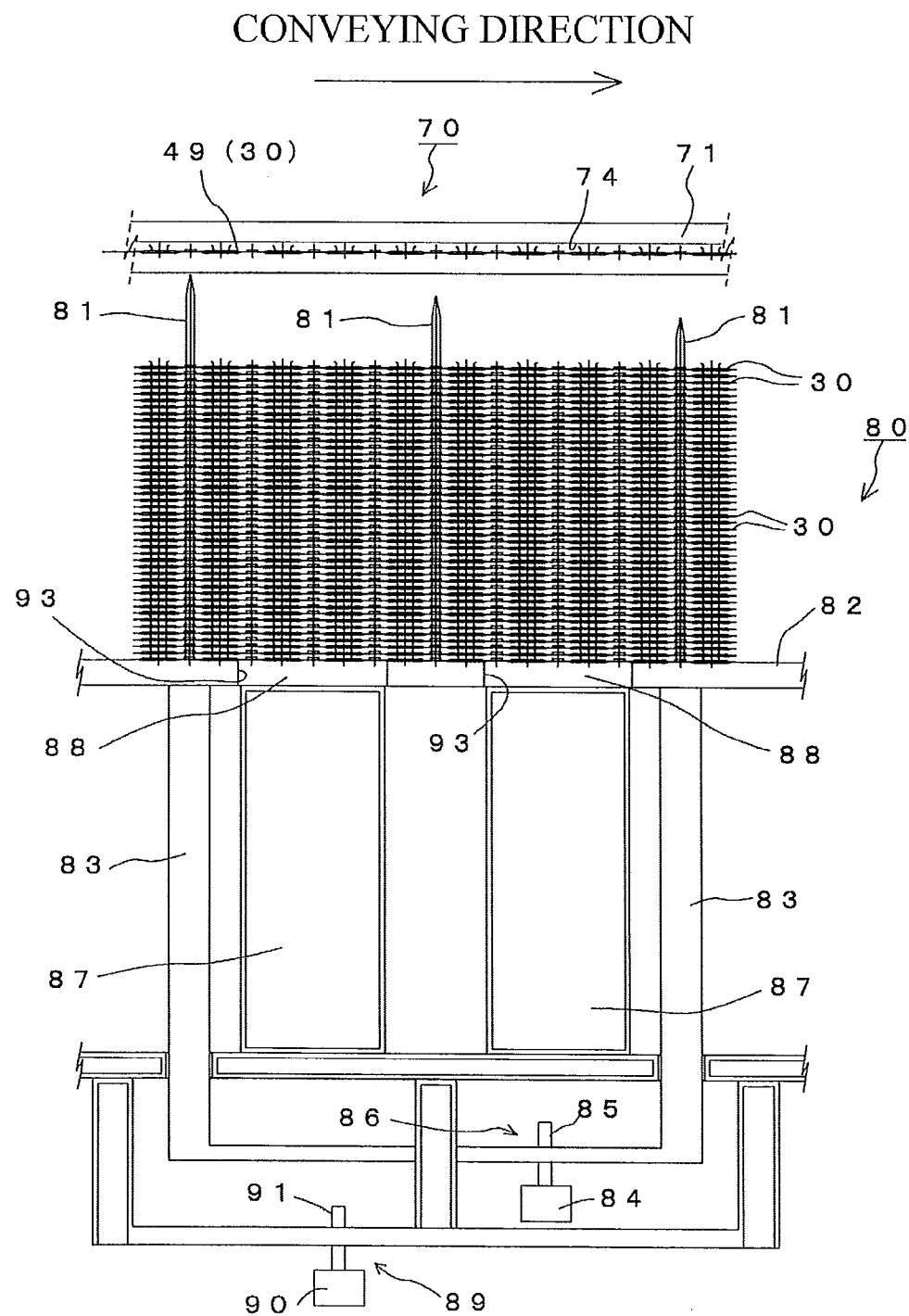
FIG. 3 is a side view of a holding apparatus and a stacker apparatus.
Figure 4:
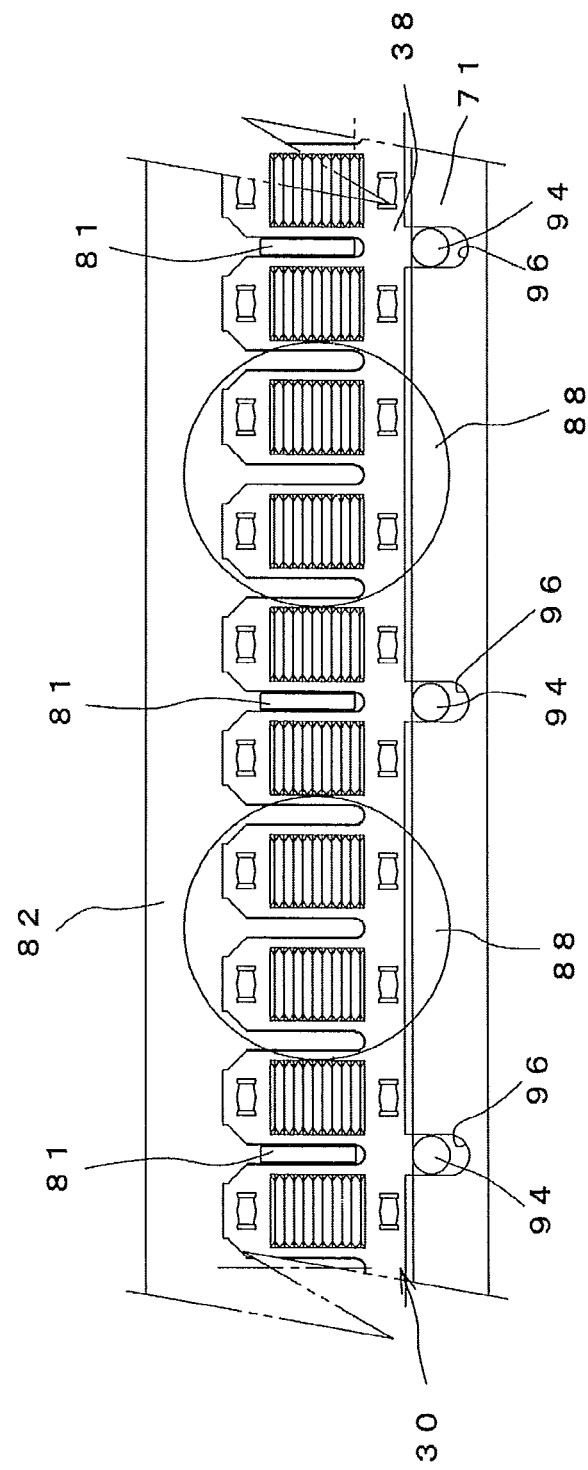
FIG. 4 is a plan view where
Figure 5:
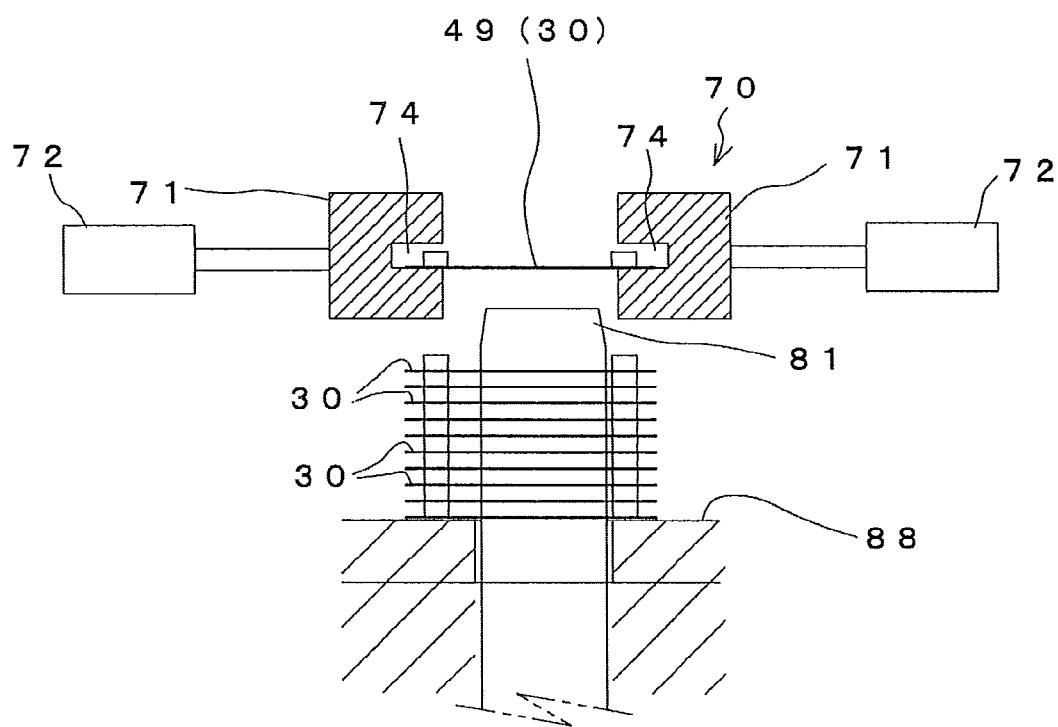
FIG. 5 is a front view where

Note that FIG. 3 depicts the holding apparatus and stacker apparatus depicted in FIG. 1 enlarged and in more detail. FIG. 4 is a plan view depicting a flattened tube fin held by the holding apparatus when looking from above. FIG. 5 is a front view when looking at the configuration in FIG. 3 from the downstream side in the conveying direction.

The holding apparatus 70 supports the metal strips 49 of the product width that have emerged in the conveying direction from the downstream side of the cutoff apparatus 60 so that the metal strips 49 of the product width are capable of sliding in the conveying direction. More specifically, the holding apparatus 70 includes pairs of supports 71, 71 disposed on both sides in the width direction of each metal strip 49 of the product width so that the end portions in the width direction of the metal strips 49 of the product width that have emerged from the cutoff apparatus 60 can be loaded thereupon. The supports 71, 71 are formed with U-shaped cross-sections. When the supports 71, 71 are viewed from the conveying direction, concave portions 74 that extend toward the outside are formed so as to face one another and so that the outer end portions in the width direction of the metal strips 49 of the product width can be loaded thereupon. Such holding apparatus 70 is capable of maintaining the held state from before the metal strips 49 of the product width are cut until after the metal strips 49 have been cut into predetermined lengths by the cutting apparatus 66 to form the flattened tube fins 30.

The supports 71, 71 are also provided so as to be capable of moving in a direction toward and away from one another (i.e., the horizontal direction). Cylinders 72 are provided as a means for moving the supports 71, 71 toward and away from one another (the cylinders 72 are omitted from drawings aside from FIG. 1 and FIG. 5).

The stacker apparatus 80 has a substantially plate-like stacking pin base portion 82 on which a plurality of stacking pins 81 (three pins in the drawings) are erected, support legs 83 that support the stacking pin base portion 82, and a stacking pin raising/lowering means 86 that is provided below the support legs 83 and raises and lowers the support legs 83.

In the present embodiment, a servo motor 84 and a ball screw 85 coupled to an output shaft of the servo motor 84 correspond to the stacking pin raising/lowering means 86.

The stacking pins 81 have a size that is capable of being inserted through the cutaway portions 34 of the flattened tube fins 30 and more specifically are substantially rectangular with the long sides in the width direction of the products in keeping with the form of the cutaway portions 34. Front ends of the stacking pins 81 may be formed so as to be sharpened or the front ends may be rounded.

FIG. 4 also depicts a state where regulating pins 94 are provided (the pins 94 are omitted from the other drawings).

The regulating pins 94 are erected at the same positions in the conveying direction of the metal strips 49 of the product width as the positions where the stacking pins 81 are erected, and at positions that contact the side edge of the joining portion 38 of a metal strip 49 of the product width. That is, the regulating pins 94 are disposed at positions so that the joining portion 38 of a metal strip 49 of the product width is sandwiched between the stacking pins 81 and the regulating pins 94 in the width direction.

In the same way as the stacking pins 81, the regulating pins 94 are erected on the upper surface of the stacking pin base portion 82. The regulating pins 94 may also be formed with the same length as the corresponding stacking pins 81.

If regulating pins 94 like these are erected, regulating pin clearance portions 96 are formed in one of the supports 71 to avoid interference with the regulating pins 94. As depicted in FIG. 4, concave cutaway portions, where part of the edge of a facing surface of one of the supports 71 that are disposed facing one another is cut away in the direction (width direction) that is perpendicular to the conveying direction of the metal strips 49 of the product width, can be set as the regulating pin clearance portions 96.

If the stacking pins 81 and the regulating pins 94 are erected on the upper surface of the stacking pin base portion 82 in this way, after the metal strips 49 of the product width have been subjected to the cutting off process to separate the flattened tube fins 30, movement of the flattened tube fins 30 in the width direction when stacking the flattened tube fins 30 in the stacker apparatus 80 is restricted by the stacking pins 81 and the regulating pins 94, thereby preventing displacement of the flattened tube fins 30 in the width direction. That is, the flattened tube fins 30 will be stacked on the stacking pin base portion 82 in a more orderly state.

The stacker apparatus 80 includes fin receiving portions 88 that move up and down independently of the up-down movement of the stacking pins 81 and are capable of having the flattened tube fins 30 loaded thereupon. Support legs 87 that extend downward so as to support the fin receiving portions 88 and a receiving portion raising/lowering means 89 that is provided below the support legs 87 and is capable of raising and lowering the support legs 87 are provided below the fin receiving portions 88.

The receiving portion raising/lowering means 89 is provided separately to the stacking pin raising/lowering means 86 and is capable of operating independently of the stacking pin base portion 82.

In the present embodiment, the receiving portion raising/lowering means 89 is constructed of a servo motor 90 and a ball screw 91 coupled to an output shaft of the servo motor 90.

The fin receiving portions 88 are formed with flat upper surfaces so that the flattened tube fins 30 can be loaded thereupon. Meanwhile, the upper surface of the stacking pin base portion 82 is also formed as a flat surface so that the flattened tube fins 30 can be loaded thereupon.

As depicted in FIG. 4, in the present embodiment, the stacking pin base portion 82 has a wider area. The fin receiving portions 88 are circular when viewed from above and have a smaller area than the stacking pin base portion 82. More specifically, circular through-holes 93 through which the fin receiving portions 88 can pass are formed at predetermined positions on the stacking pin base portion 82 so that the stacking pin base portion 82 and the fin receiving portion 88 can be freely moved up and down relative to one another without interfering with each other.

Note that in the state depicted in FIG. 3, the stacking pin base portion 82 and the fin receiving portions 88 are at the same position in the height direction and the upper surfaces of the stacking pin base portion 82 and the fin receiving portions 88 also lie on the same plane. A flattened tube fin 30 is loaded onto the upper surfaces of the stacking pin base portion 82 and the fin receiving portions 88 that lie on the same plane.

Next, the construction and operation of the holding apparatus 70 and the stacker apparatus 80 when stacking a first flattened tube fin 30 onto the stacker apparatus 80 will be described with reference to FIGS. 6, 7, 8A, 8B and 8C.

First, the cylinders 72 extend before the metal strips 49 of the product width pass (i.e., are fed out from) the position of the upper blade 68 and the lower blade 69 of the cutting apparatus 66 in the cutoff apparatus 60. The respective U-shaped concave portions 74 of the pair of supports 71 approach one another and are set at positions where both side edges in the width direction and the bottom surface of a metal strip 49 of the product width can be held by the pair of supports 71.

Once the pair of supports 71 have been set at positions where both side edges and the bottom surface of a metal strip 49 of the product width can be held, a metal strip 49 of the product width is fed out by the feeding apparatus 62. The metal strip 49 of the product width is held so as to not drop and is guided in the conveying direction along a guide space formed by the pair of supports 71, 71 disposed with the respective concave portions 74 facing one another.

After a metal strip 49 of the product width has been conveyed a specified distance by the feeding apparatus 62, the feeding apparatus 62 temporarily stops.

After this, the servo motor 84 of the stacking pin raising/lowering means 86 is driven to raise the stacking pin base portion 82. Note that in the present embodiment the lengths of the three stacking pins 81 are provided so as to become gradually lower in the conveying direction (that is, so that the heights of the upper ends of the three stacking pins 81 become gradually lower the greater the distance from the cutoff apparatus 60). Accordingly, as the stacking pin base portion 82 is raised, the stacking pins 81 are inserted into the metal strip 49 of the product width feed out from the cutoff apparatus 60 in order starting from a cutaway portion 34 on the cutoff apparatus 60 side.

By inserting the stacking pins 81 in order starting from a cutaway portion 34 on the cutoff apparatus 60 side, the stacking pins 81 will be inserted first into a cutaway portion 34 on the cutoff apparatus 60 side that has the least positional displacement. This means that it is possible to correct any width displacement at a front end part in the conveying direction of a metal strip 49 of the product width and it is possible to reliably insert the stacking pins 81 into all of the cutaway portions 34.

When all of the stacking pins 81 (in the present embodiment, the three stacking pins 81) have been inserted through the cutaway portions 34 of a metal strip 49 of the product width, the cutting apparatus 66 of the cutoff apparatus cuts off a metal strip 49 of the product width at a predetermined position to separate a flattened tube fin 30 from the metal strip 49 of the product width.

When carrying out the cutting process on the metal strip 49 of the product width in this way, since the metal strip 49 of the product width is held in a positioned state with the stacking pins 81 inserted through the cutaway portions 34, the cutting process can be carried out accurately. That is, it is possible to obtain a flattened tube fin 30 with high dimensional precision.

The flattened tube fin 30 that has been separated by the cutting apparatus 66 is held by the supports 71 in a state where the stacking pins 81 are inserted into the cutaway portions 34 in the same way as before separation.

Also, the fin receiving portions 88 that receive the first flattened tube fin 30 are disposed by the receiving portion raising/lowering means 89 at a position that is raised in advance beyond the stacking pin base portion 82 so that the dropped distance of the flattened tube fin 30 is extremely short.

Figure 7:
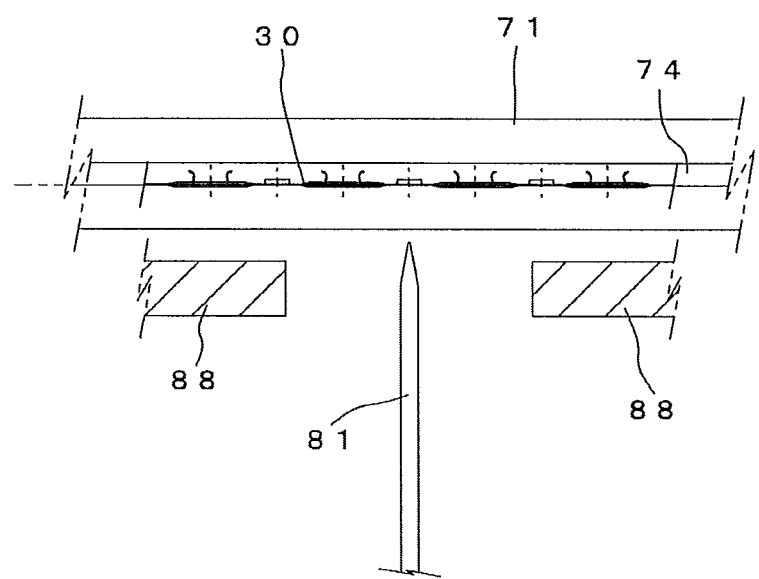
FIG. 7 is a side view of the holding apparatus and the stacker apparatus when depicting an initial position of the stacking pins and the fin receiving portions when stacking a first flattened tube fin.
Figure 8A:
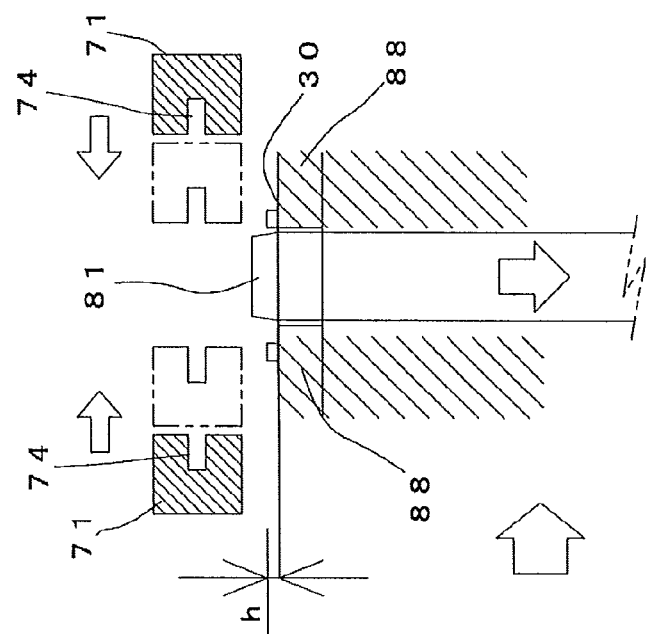
FIGS. 8A, 8B, and 8C are front views when looking from the front in the conveying direction depicting the operation of the holding apparatus and the stacker apparatus when stacking a first flattened tube fin.

FIG. 8A depicts the state in FIG. 7 when looking from the front in the conveying direction. Here, a point where a flattened tube fin 30 has been separated by cutting the metal strip 49 of the product width into a predetermined length is depicted.

Figure 8B:
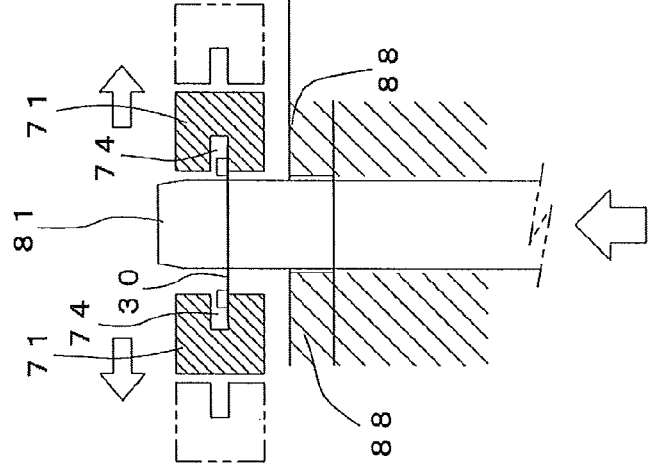

In FIG. 8B, first the stacking pin raising/lowering means 86 is driven and the stacking pins 81 are inserted into the cutaway portion 34 of the flattened tube fin 30.

Next, the cylinders 72 that are the means for driving the supports 71, 71 together and away from one another shorten so that the pair of the supports 71, 71 move horizontally in a direction away from the flattened tube fin 30. Due to the supports 71, 71 moving horizontally to release the holding of the flattened tube fin 30, the flattened tube fin 30 falls along the stacking pins 81 that are inserted through the cutaway portion 34 onto the stacking pin base portion 82. At this time, since there is very little distance between the upper surfaces of the fin receiving portions 88 and the surfaces (the inner bottom surfaces of the concave portions 74) of the supports 71, 71 that hold the flattened tube fin 30, the dropped distance is very short and it is possible to stack the flattened tube fin 30 onto the stacking pin base portion 82 in an orderly manner.

Figure 8C:
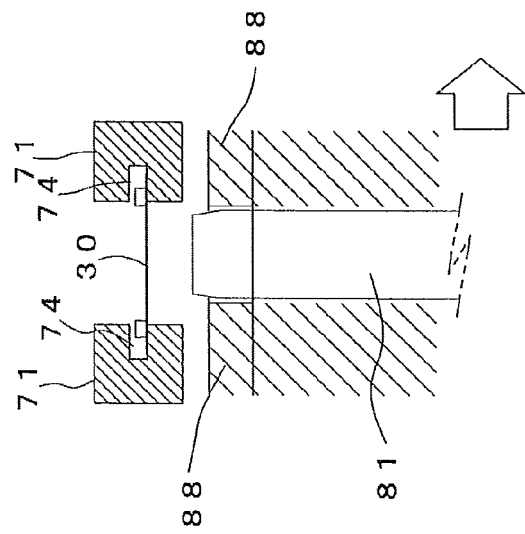

As depicted in FIG. 8C, after the flattened tube fin 30 has dropped onto the fin receiving portions 88, the stacking pin raising/lowering means 86 is driven and the stacking pins 81 are lowered to an initial position (the position depicted in FIG. 7 and FIG. 8A). This is because the stacking pins 81 would obstruct the conveying of the next metal strip 49 of the product width if the stacking pins 81 were not lowered to such position.

The fin receiving portions 88 are also lowered separately to the lowering operation of the stacking pins 81. The lowering operation of the fin receiving portions 88 is carried out by driving the receiving portion raising/lowering means 89. The lowered distance h of the fin receiving portions 88 is around the same as the thickness in the up-down direction of one flattened tube fin 30. The fin receiving portions 88 are lowered by around the thickness in the up-down direction of the flattened tube fin 30 every time one flattened tube fin 30 is dropped. For this reason, it is possible to prevent the upper surface of the stacked flattened tube fins 30 from obstructing the supports 71, 71 while always keeping the distance dropped by a flattened tube fin 30 short.

In addition, in FIG. 8C, the cylinders 72 that are the means for driving the supports 71, 71 together and away from one another extend so that the pair of the supports 71 approach one another and move horizontally to the initial position where it is possible to hold the next metal strip 49 of the product width to be held.

Note that the lowering operation of the stacking pins 81 and the lowering operation of the fin receiving portions 88 may be carried out in any order or may be carried out at the same time. Note that the operation that moves the supports 71 toward one another should preferably be carried out after at least the lowering operation of the fin receiving portions 88 so that the supports 71 do not contact the flattened tube fins 30 stacked on the fin receiving portions 88.

Next, the construction and operation of the holding apparatus 70 and the stacker apparatus 80 after two or more flattened tube fins 30 have been stacked will be described with reference to FIG. 9 and FIGS. 10A, 10B and 10C.

Figure 9:
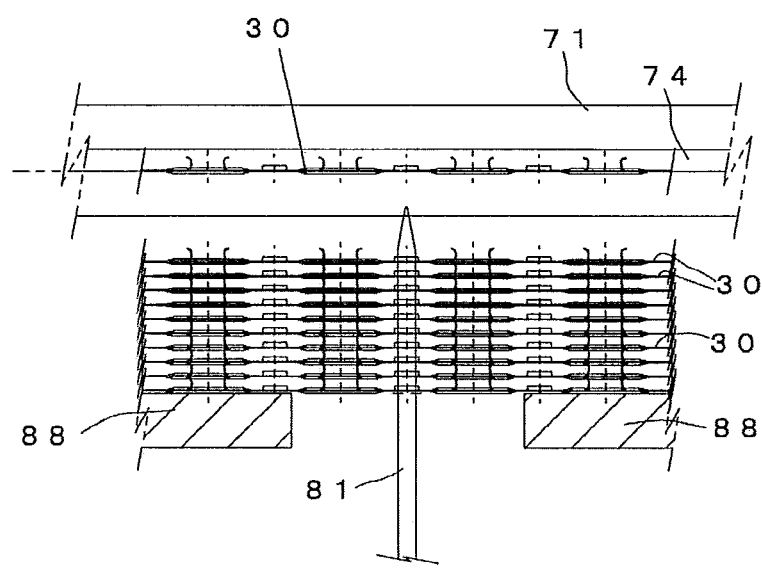
FIG. 9 is a side view of the holding apparatus and the stacker apparatus depicting initial positions of the stacking pins and the fin receiving portions when stacking a flattened tube fin in a stacker apparatus in which a plurality of flattened tube fins are already stacked.

FIG. 9 depicts a state where a plurality of flattened tube fins 30 are already stacked on the stacker apparatus 80 and the metal strip 49 of the product width held in the holding apparatus 70 has been cut into a predetermined length to separate a flattened tube fin 30.

After this, as depicted in FIGS. 10A and 10B, first the stacking pin raising/lowering means 86 is driven and the stacking pins 81 are inserted through the cutaway portions 34 of the flattened tube fin 30.

Next, the cylinders 72 that are the means for driving the supports 71, 71 together and away from one another shorten so that the pair of supports 71 move horizontally in a direction away from the flattened tube fin 30. Due to the supports 71, 71 moving horizontally to release the holding of the flattened tube fin 30, the flattened tube fin 30 drops along the stacking pins 81 that are inserted through the cutaway portion 34 onto the top of the stacked flattened tube fins 30.

At this time, since there is very little distance between the upper surface of the top of the stacked flattened tube fins 30 and the surfaces (the inner bottom surfaces of the concave portions 74) of the supports 71 that hold the flattened tube fin 30, the dropped distance is very short and it is possible to stack the flattened tube fin 30 in an orderly manner.

Also, in FIG. 10B, after the flattened tube fin 30 has been dropped toward the fin receiving portions 88, the stacking pin raising/lowering means 86 is driven to lower the stacking pins 81 to the initial positions (the positions in FIG. 8). This is because the stacking pins 81 would obstruct the conveying of the next metal strip 49 of the product width if the stacking pins 81 were not lowered to such position.

The fin receiving portions 88 are also lowered independently of the lowering operation of the fin receiving portions 88. The lowering operation of the fin receiving portions 88 is carried out by driving the receiving portion raising/lowering means 89. The lowered distance of the fin receiving portions 88 is around the same as the thickness in the up-down direction of one flattened tube fin 30. The fin receiving portions 88 are lowered by around the thickness in the up-down direction of one flattened tube fin 30 every time one flattened tube fin 30 is dropped. For this reason, it is possible to prevent the upper surface of the stacked flattened tube fins 30 from obstructing the supports 71, 71 while always keeping the distance dropped by the flattened tube fins 30 short.

In addition, after the flattened tube fin 30 drops, the cylinders 72 that are the means for driving the supports 71, 71 together and away from one another extend so that the pair of the supports 71 approach one another and move horizontally to the initial position where it is possible to hold the next metal strip 49 of the product width to be held.

Note that the lowering operation of the stacking pins 81 and the lowering operation of the fin receiving portions 88 may be carried out in any order or may be carried out at the same time. Note that the operation that moves the supports 71 toward one another should preferably be carried out at least after the lowering operation of the fin receiving portions 88 so that the supports 71 do not contact the flattened tube fins 30 stacked on the fin receiving portions 88.

In FIG. 10C the fin receiving portions 88 is raised by driving the receiving portion raising/lowering means 89 and the upper surface of the flattened tube fin 30 that is positioned at the top of the stacked flattened tube fins 30 is placed in contact with the lower surfaces of the supports 71.

By carrying out this operation, even in an unfavorable stacking state where the flattened tube fins 30 stacked in the fin receiving portions 88 are somewhat inclined, the upper and lower surfaces of the stacked flattened tube fins 30 are pressed between the fin receiving portions 88 and the supports 71, which makes it possible to produce a stacked state where the flattened tube fins 30 are neatly aligned.

After the upper surface of the stacked flattened tube fins 30 has been brought into contact with the lower surface of the supports 71, the fin receiving portions 88 are then lowered by driving the receiving portion raising/lowering means 89.

The lowered position of the fin receiving portions 88 is a position where the next dropped flattened tube fin 30 will be received when the next flattened tube fin 30 has dropped.

Note that the series of operations described above is repeatedly carried out until the number of flattened tube fins 30 that are stacked in the stacker apparatus 80 reaches a predetermined number.

If the flattened tube fins 30 stacked in the stacker apparatus 80 reach a predetermined number, the stacking pin base portion 82 is removed from the support legs 83 and can be moved to the next process in a state where the stacking pins 81 are inserted through the cutaway portion 34.

The stacking of flattened tube fins 30 can then be restarted by attaching an empty pin base portion 82 on which a plurality of stacking pins 81 are erected onto the support legs 83.

In this way, up-down movement of the fin receiving portions 88 is carried out separately to the up-down movement of the stacking pins 81, the lowered distance of the fin receiving portions 88 is around the thickness of one flattened tube fin 30, and the fin receiving portions 88 are raised by a distance such that the upper surface at the top of the stacked flattened tube fins 30 contacts the lower surfaces of the supports 71. The raised distance is an extremely short distance from the receiving position where the dropped flattened tube fin 30 was received to the lower surfaces of the supports 71.

Accordingly, it is possible to reduce the time spent raising and lowering the fin receiving portions 88 and to shorten the manufacturing cycle for one flattened tube fin, thereby increasing the manufacturing efficiency.

Note that the operation of the holding apparatus 70 and the stacker apparatus 80 described above is carried out according to control by a control unit 110 (see FIG. 1).

Note that since it is necessary to synchronize the various apparatuses that construct a manufacturing apparatus 100 for flattened tube fins in addition to simply controlling the holding apparatus 70 and the stacker apparatus 80, the control unit 110 carries out the overall operation of the manufacturing apparatus 100 for flattened tube fins.

That is, the series of operations by the NC feeder 44, the press apparatus 48, the feeding apparatus 50, the inter-row slit apparatus 52, the cutoff apparatus 60, the holding apparatus 70, and the stacker apparatus 80 are controlled and synchronized by the control unit 110.

As the control unit 110, it is possible to store a control program in a storage means and use a sequencer that has a central processing unit (CPU), a personal computer, or the like to carry out operations based on the control program.

Figure 6:
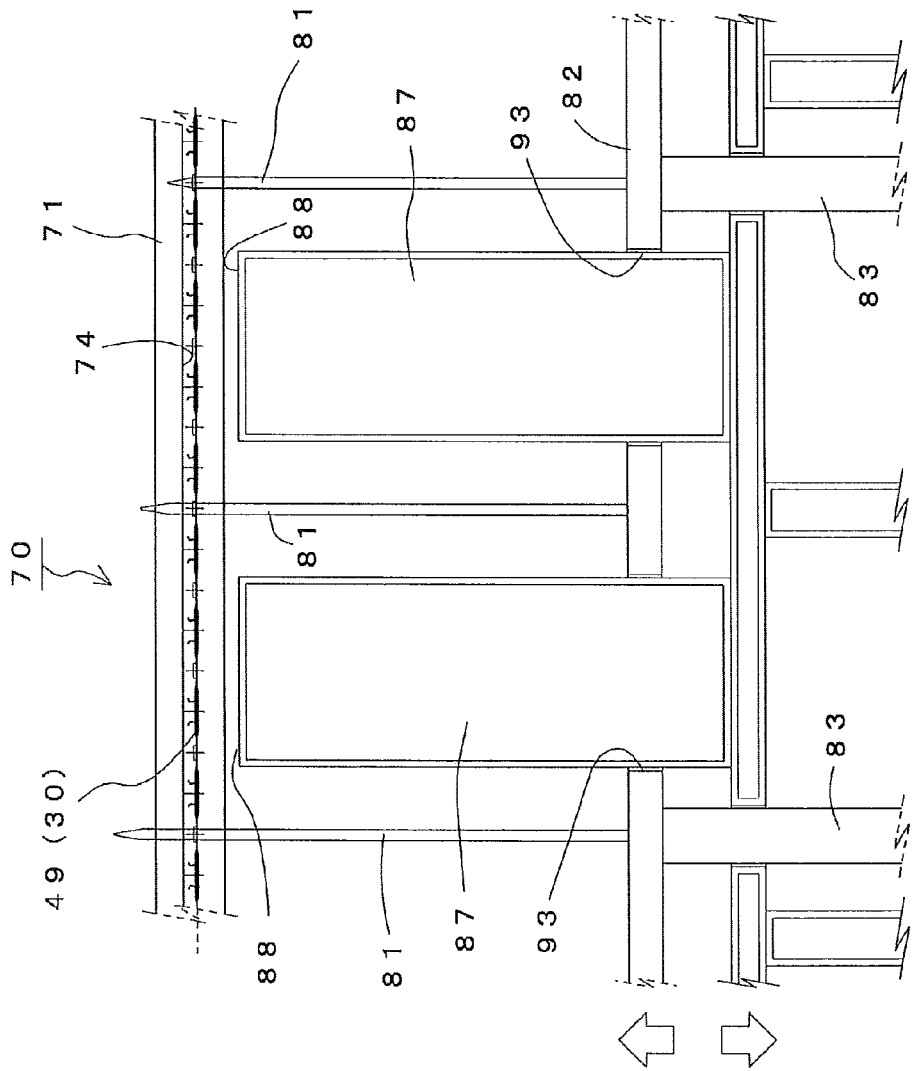
FIG. 6 is a side view depicting the operation of the holding apparatus and the stacker apparatus when stacking a first flattened tube fin.

Note that as depicted in FIGS. 3 and 6, the heights of the upper ends of the stacking pins 81 erected on the stacking pin base portion 82 are set so that the position of the top of the stacking pin 81 erected on the upstream side (the cutoff apparatus 60 side) in the conveying direction of the metal strips 49 of the product width is the highest and the positions of the tops of the stacking pins 81 become gradually lower toward the downstream side in the conveying direction (i.e., moving away from the cutoff apparatus 60).

More specifically, the lengths of the stacking pins 81 erected on the stacking pin base portion 82 become gradually shorter from the upstream side in the conveying direction of the metal strips 49 of the product width toward the downstream side.

By using the stacking pins 81 of this construction, the stacking pins 81 will be inserted through the cutaway portions 34 of a metal strip 49 in order from the cutoff apparatus 60 side (the upstream side in the conveying direction).

Since the feeding out position of the metal strip 49 of the product width on the cutoff apparatus 60 side is extremely close to or matches the intended feeding out position in the design, there is no risk of displacement when the stacking pin 81 is inserted through the cutaway portion 34 of the metal strip 49 of the product width. By then inserting the stacking pins 81 from the cutoff apparatus 60 side, it is possible to make adjustments so that the front edge on the downstream side in the conveying direction of a metal strip 49 of the product width matches the intended position.

Accordingly, it is possible to prevent displacements in the insertion positions of the stacking pins 81 for all of the cutaway portions 34 of a metal strip 49 of the product width and to prevent damage to the metal strip 49 of the product width by the stacking pins 81.

Note that in the embodiment given above, a configuration provided with the inter-row slit apparatus 52 for manufacturing the thin metal plate 41 that is yet to be machined into a plurality of flattened tube fins 30 in parallel in the width direction has been described.

However, in a case where a long and narrow thin metal plate 41 is used and a single flattened tube fin 30 is formed in the width direction of the thin plate 41, the inter-row slit apparatus 52 can be omitted. Also, when simultaneously manufacturing a plurality of flattened tube fins 30 in the width direction of the thin plate 41 in the same way as the embodiments described above, to maintain a left-right balance of the mold, it is preferable to dispose an even number of flattened tube fins 30 in the width direction of one thin plate and provide the flattened tube fins 30 in pairs with the cutaway portions 34 facing one another.

In addition, although supports 71 formed with U-shaped cross sections have been described in the embodiment described above, the supports 71 may be any shape with at least a bottom surface and a side surface as the concave portions 74 that extend toward the outside in the width direction, and in more detail it is possible to use supports 71 with an L-shaped or C-shaped cross section.

Also, although a configuration where the supports 71 are continuous in the feeding direction of the metal strips 49 has been described above, it is also possible to use a configuration where a plurality of supports 71 formed into specified lengths are disposed at predetermined intervals along the length direction of the flattened tube fin 30. If the stacking pins 81 and the regulating pins 94 are disposed so as to advance into the intervals between the supports 71, it is possible to prevent the regulating pins 94 from interfering with the supports 71.

Also, although cylinders 72 are used as the means for moving the supports 71, 71 toward and away from each other in the embodiment described above, so long as the supports 71 can be moved, the means is not especially limited to cylinders.

In addition, a configuration where a servo motor and a ball screw coupled to the output shaft of the servo motor are used as the stacking pin raising/lowering means 86 and the receiving portion raising/lowering means 89 has been described above. However, as the respective raising/lowering means, the configuration is not limited to a combination of a servo motor and a ball-screw described above.

Figure 11:
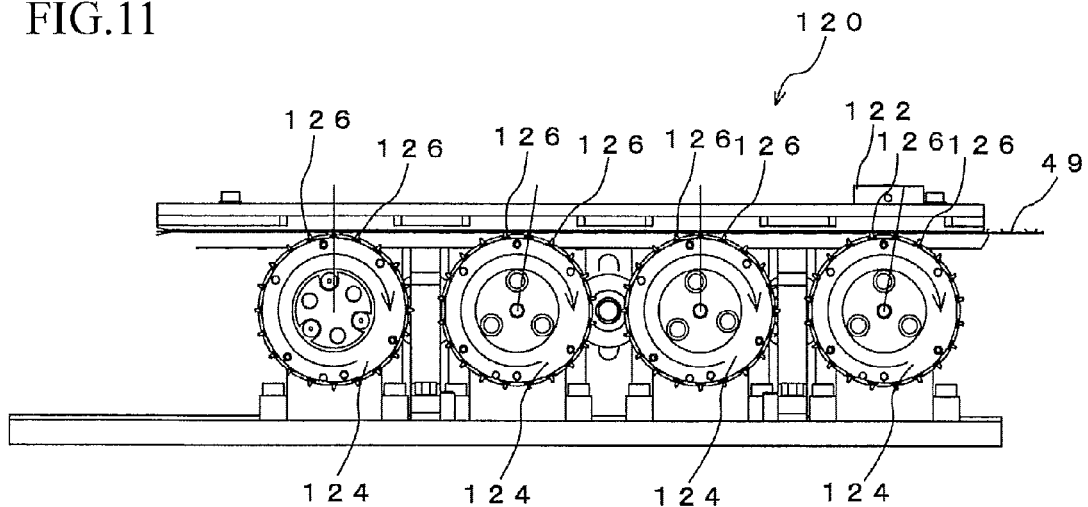
FIG. 11 is a side view depicting another embodiment of a feeding apparatus.

FIG. 11 is a side view depicting the principal part of another embodiment of a feeding apparatus.

The feeding apparatus 120 depicted in FIG. 11 feeds out a metal strip 49 (and/or a metal strip 49 of the product width) in the conveying direction.

It is possible to use the feeding apparatus 120 depicted in FIG. 11 as the feeding apparatus in the press apparatus 48 or the feeding apparatus in the cutoff apparatus 60.

The feeding apparatus 120 includes a drive motor 122 and a plurality of rotating discs 124 that are coupled to the output shaft of the drive motor 122. Feed pins 126 that protrude outward in the radial direction of the rotating discs 124 are provided on the side surfaces at the outer circumferential edges of the rotating discs 124. A plurality of feed pins 126 are provided at specified intervals in the circumferential direction of the rotating discs 124.

The rotating discs 124 are directly coupled or coupled via a power transmission means such as a timing belt to the output shaft of the drive motor 122 and rotate in the same rotational direction as each other in a synchronized state in accordance with rotation of the drive motor 122.

An on/off operation and the rotational speed of the drive motor 122 may be controlled by the control unit 110 so as to be synchronized with an operation of other apparatuses of the manufacturing apparatus 100 for flattened tube fins. Meanwhile if a buffer part B is provided for the metal strips 49 as depicted in FIG. 1, it is possible to drive a feeding apparatus that is upstream of the buffer part B (a feeding apparatus inside the press apparatus 48) at a constant speed.

As depicted in FIG. 11, the feed pins 126 erected on the rotating discs 124 are inserted through the cutaway portion 34 of the metal strips 49 (and/or the metal strips 49 of the product width) and due to the rotating discs 124 rotating, the metal strips 49 (and/or the metal strips 49 of the product width) are fed out in the conveying direction.

Since the erected positions of the feed pins 126 in the present embodiment have a shifted phase relative to the erected positions of the feed pins 126 on at least the adjacent rotating discs 124, the feed pins 126 of at least one rotating disc 124 will be inserted through the cutaway portions 34 of the metal strips 49 (and/or the metal strips 49 of the product width). By doing so, it is possible to constantly apply a feeding force in the conveying direction to the metal strips 49 (and/or the metal strips 49 of the product width) and also to guide in the conveying direction.

Although the present invention has been described above by way of the preferred embodiments, the present invention is not limited to such embodiments and it should be obvious that various modifications may be implemented without departing from the scope of the invention.

For example, although a configuration provided with the inter-row slit apparatus 52 for manufacturing the thin metal plate 41 that is yet to be machined into a plurality of flattened tube fins 30 in parallel in the width direction has been described in the above embodiments, in a case where a long and narrow thin metal plate 41 is used and a single flattened tube fin 30 is formed in the width direction of the thin plate 41, the inter-row slit apparatus 52 can be omitted. Also, when simultaneously manufacturing a plurality of flattened tube fins 30 in the width direction of the thin plate 41 in the same way as the embodiments described above, to maintain a left-right balance of the mold, it is preferable to dispose an even number of flattened tube fins 30 in the width direction of one thin plate and provide the flattened tube fins 30 in pairs with the cutaway portions 34 facing one another.

In addition, supports 71 formed with U-shaped cross sections have been described in the embodiment described above.

However, the supports 71 may be any shape that has at least a bottom surface and a side surface, and in more detail it is possible to use supports 71 with an L-shaped or C-shaped cross section.

Figure 12:
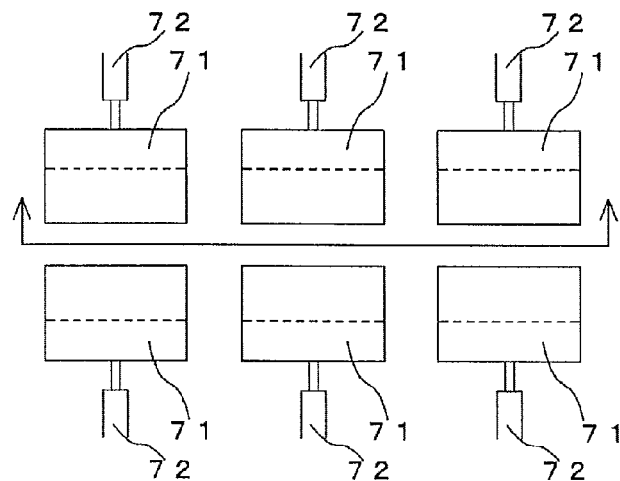
FIG. 12 is a plan view depicting another embodiment of supports.

Also, although a configuration where the supports 71 are shaped so as to be continuous in the feeding direction of the metal strips 49 has been described above, it is also possible to use a configuration where a plurality of supports 71 formed into specified lengths are disposed at predetermined intervals along the length direction of a flattened tube fin 30 as depicted in FIG. 12. In a case where a plurality of supports 71 are provided in the conveying direction in this way, by disposing the stacking pins 81 and the regulating pins 94 so as to advance into the intervals between the supports 71, it is possible to omit the formation of the regulating pin clearance portions 96 in the supports 71.

Figure 13:
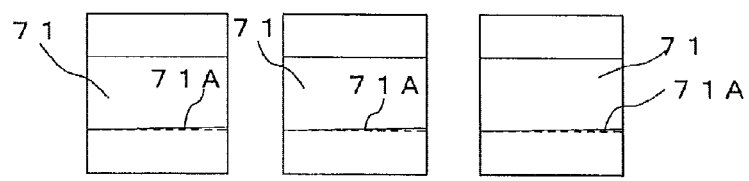
FIG. 13 is a plan view depicting another embodiment of supports.
Figure 14:
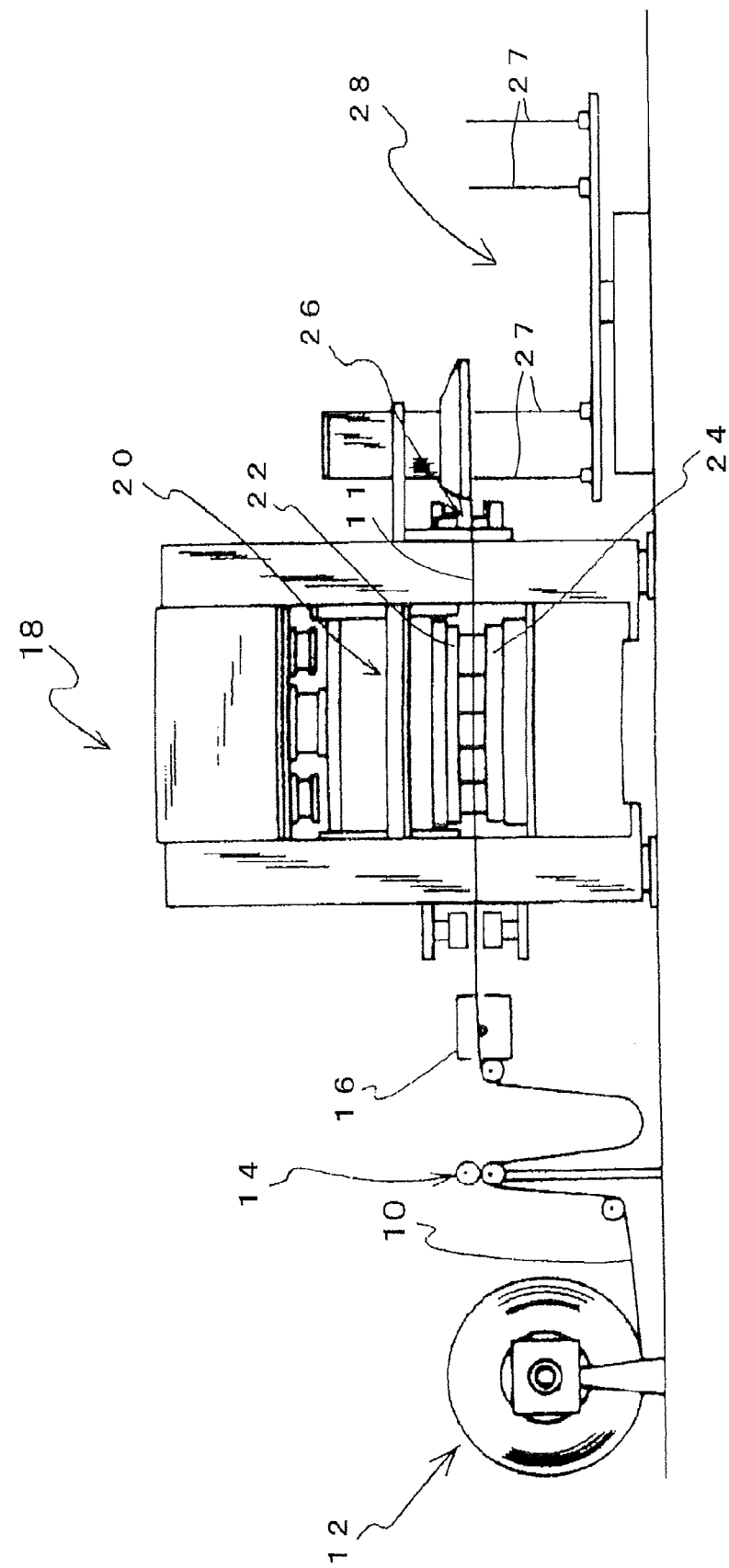
FIG. 14 is a simplified side view depicting the overall configuration of an existing manufacturing apparatus for heat exchanger fins.

FIG. 13 is a front view of an opening side of the supports 71 when looking in the direction of the arrow in FIG. 12. As depicted in FIG. 13, in each of the plurality of supports 71 provided along the conveying direction, it is also possible to form internal bottom surfaces 71A that hold the metal strips 49 of the product width in a shape that becomes gradually higher from the upstream side to the downstream side in the conveying direction of the metal strips 49 of the product width. By using this configuration, it is possible to smoothly feed a metal strip 49 of the product width without the front edge portion catching on the upstream end surface (front end surface) of a support 71 disposed downstream.

Also, although embodiments where cylinders 72 are used as the means for moving the supports 71 toward and away from each other and the servo motor 84 and the ball screw 85 coupled to the output shaft of the servo motor 84 are used as the raising/lowering means for the base portion 82 have been described above, the means for moving the supports 71 toward and away from each other and the raising/lowering means for the base portion 82 are not limited to such configurations. The means for moving the supports 71 toward and away from each other and the raising/lowering means for the stacking pin base portion 82 can be configured using other known appliances. It is also possible to configure an embodiment where parts of the embodiments described above are combined as appropriate.

What is claimed is:
1. A manufacturing apparatus that manufactures flattened tube fins wherein flattened tubes for heat exchanging are inserted into cutaway portions formed from one side toward another side in a width direction, the manufacturing apparatus comprising:

a press apparatus equipped with a mold apparatus that forms the cutaway portions in an unmachined thin plate of metal to produce a metal strip;

an inter-row slit apparatus which cuts the metal strip, in which the cutaway portions have been formed, into predetermined widths to form a plurality of metal strips of a product width that are arranged in the width direction;

a cutoff apparatus that cuts each of the plurality of metal strips of the product width into predetermined lengths;

a holding apparatus that holds the plurality of metal strips of the product width that have been formed by the inter-row slit apparatus, have been fed in the conveying direction, have passed the cutoff apparatus, and protrude out from a downstream side in the conveying direction of the cutoff apparatus, guides a conveying direction of the metal strips of the product width, and maintains a held state even after cutting into the predetermined lengths by the cutoff apparatus to form the flattened tube fins; and a stacker apparatus for stacking the flattened tube fins cut into the predetermined lengths by the cutoff apparatus, wherein the holding apparatus includes pairs of supports that are provided so as to be capable of moving toward and away from one another between a position to the side of the metal strips of the product width fed from the inter-row slit apparatus and a holding position for the metal strips of the product width, and the stacker apparatus includes:

a plurality of stacking pins that are inserted through the cutaway portion of the flattened tube fins and are aligned in a length direction of the flattened tube fins in order to stack the flattened tube fins held by the holding apparatus; and a raising/lowering means for raising and lowering the stacking pins in a direction of the holding apparatus.

2. A manufacturing apparatus that manufactures flattened tube fins according to claim 1, wherein the raising/lowering means of the stacker apparatus operates so that a distance by which the stacking pins are raised relative to the holding apparatus gradually decreases as the number of flattened tube fins stacked with the stacking pins inserted therethrough increases.

3. A manufacturing apparatus that manufactures flattened tube fins according to claim 1, wherein the raising/lowering means of the stacker apparatus operates so that the stacking pins are inserted in order from cutaway portions on a cutoff apparatus side of the metal strips of the product width to cutaway portions on a downstream side in a conveying direction of the metal strip of the product width.

4. A manufacturing apparatus that manufactures flattened tube fins according to claim 1, wherein the stacking pins are formed so that positions in a height direction of top ends thereof become gradually lower as the distance from the cutoff apparatus side increases.

5. A manufacturing apparatus that manufactures flattened tube fins according to claim 1, wherein the stacker apparatus is provided with regulating pins that are raised and lowered by the raising/lowering means together with the stacking pins and contact side surfaces of the metal strips of the product width when raised to regulate positions of the metal strip of the product width.

6. A manufacturing apparatus that manufactures flattened tube fins according to claim 5, wherein the supports 71 include regulating pin clearance portions for avoiding interference with the regulating pins.

7. A manufacturing apparatus that manufactures flattened tube fins according to claim 1, wherein the supports 71 are formed with U-shaped cross sections.

8. A manufacturing apparatus that manufactures flattened tube fins according to claim 1, wherein the stacker apparatus includes fin receiving portions that contact a lower surface of a lowest flattened tube fin out of a plurality of flattened tube fins through which the stacking pins have been inserted and are capable of being raised and lowered independently of a raising/lowering operation of the stacking pins.

9. A manufacturing apparatus that manufactures flattened tube fins according to claim 8, wherein the fin receiving portions operate so as to raise the plurality of flattened tube fins stacked with the stacking pins inserted therethrough and place an upper surface of a top flattened tube fin out of the stacked flattened tube fins in contact with a lower surface of the holding apparatus so as to align the stacked flattened tube fins.

10. A manufacturing apparatus that manufactures flattened tube fins according to claim 9, further comprising a control unit that controls operations of the holding apparatus, the stacking pins and the fin receiving portions, wherein the control unit carries out control so that:

after a metal strip of the product width held by the holding apparatus has been cut by the cutoff apparatus to form a flattened tube fin, the stacking pins are raised so as to advance into the cutaway portions of the flattened tube fin held by the holding apparatus;

the pair of supports of the holding apparatus are moved away from one another to drop the flattened tube fin along the stacking pins;

after the flattened tube fin drops, the stacking pins are lowered until upper end portions of the stacking pins reach an initial position that is below the holding apparatus;

the fin receiving portions are lowered until an upper surface of the flattened tube fin positioned at a top of the stacked flattened tube fins reaches a predetermined position that is below the holding apparatus;

the pair of supports of the holding apparatus are moved toward one another to a holding position where it is possible to hold the metal strip of the product width before cutting by the cutoff apparatus;

the fin receiving portions align the stacked flattened tube fins by placing the upper surface of the flattened tube fin positioned at the top out of the stacked flattened tube fins in contact with the lower surfaces of the pair of supports of the holding apparatus; and after aligning the flattened tube fins, the fin receiving portions are lowered to a receiving position where a dropped flattened tube fin will be received when the next flattened tube fin is dropped.

11. A manufacturing apparatus that manufactures flattened tube fins according to claim 10, wherein the control unit carries out control so that the receiving position of the fin receiving portions is lowered in keeping with an increase in the number of stacked flattened tube fins.

* * * * *